(12) United States Patent
Käll

(10) Patent No.: US 11,498,142 B2
(45) Date of Patent: Nov. 15, 2022

(54) LASER METAL WIRE DEPOSITION

(71) Applicant: GKN Aerospace Sweden AB, Trollhättan (SE)

(72) Inventor: Johan Käll, Trollhättan (SE)

(73) Assignee: GKN AEROSPACE SWEDEN AB, Trollhättan (SE)

(*) Notice: Subject to any disclaimer, the term of this patent is extended or adjusted under 35 U.S.C. 154(b) by 630 days.

(21) Appl. No.: 16/478,047

(22) PCT Filed: Jan. 17, 2018

(86) PCT No.: PCT/EP2018/051126
§ 371 (c)(1),
(2) Date: Jul. 15, 2019

(87) PCT Pub. No.: WO2018/134264
PCT Pub. Date: Jul. 26, 2018

(65) Prior Publication Data
US 2019/0351497 A1    Nov. 21, 2019

(30) Foreign Application Priority Data

Jan. 17, 2017    (GB) ..................... 1700808

(51) Int. Cl.
| | |
|---|---|
| *B23K 3/06* | (2006.01) |
| *B23K 1/005* | (2006.01) |
| *B23K 26/14* | (2014.01) |
| *B23K 26/34* | (2014.01) |

(52) U.S. Cl.
CPC ............ *B23K 3/063* (2013.01); *B23K 1/0056* (2013.01); *B23K 26/147* (2013.01); *B23K 26/34* (2013.01)

(58) Field of Classification Search
CPC .... B23K 3/063; B23K 1/0056; B23K 26/147; B23K 26/34; B23K 3/085; B23K 15/0026
See application file for complete search history.

(56) References Cited

U.S. PATENT DOCUMENTS 4,309,590 A  *  1/1982  Stol ..................... B23K 9/0213
                                                    219/136
4,667,083 A  *  5/1987  Stol ..................... B23K 9/285
                                                    219/136
(Continued)

FOREIGN PATENT DOCUMENTS

CN       1351919 A     6/2002
CN     103132072 A     6/2013
(Continued)

OTHER PUBLICATIONS

International Search Report and Written Opinion for PCT/EP2018/051126 dated May 9, 2018 (20 pages).
(Continued)

*Primary Examiner* — Helena Kosanovic
*Assistant Examiner* — Yl Hao
(74) *Attorney, Agent, or Firm* — Bejin Bieneman PLC

(57) ABSTRACT

A wire dispenser for a laser metal wire deposition machine comprises a longitudinal duct for guiding a wire from a proximal end to a distal end of the duct. A nozzle unit is connected to the distal end of the duct and has a through bore for receiving the wire from the distal end of the duct and for discharging the wire adjacent to a laser metal wire deposition site. The nozzle unit includes a cooling circuit for a cooling liquid.

14 Claims, 9 Drawing Sheets

(56) References Cited

U.S. PATENT DOCUMENTS

| | | | |
|---|---|---|---|
| 5,958,261 A | 9/1999 | Offer et al. | |
| 5,998,758 A * | 12/1999 | Moser | B23K 26/04 219/121.75 |
| 8,686,317 B2 * | 4/2014 | Centner | B23K 9/285 219/137.62 |
| 10,350,691 B2 * | 7/2019 | Williamson | B23K 26/703 |
| 2010/0078411 A1 * | 4/2010 | Hughes | B23K 26/144 219/121.63 |
| 2011/0084053 A1 * | 4/2011 | Doyle | B23K 9/295 219/136 |
| 2012/0285932 A1 * | 11/2012 | Yuan | B23K 9/173 219/74 |
| 2014/0265049 A1 * | 9/2014 | Burris | B22F 12/44 264/497 |
| 2017/0297140 A1 * | 10/2017 | Taminger | B23K 15/0006 |

FOREIGN PATENT DOCUMENTS

| | | |
|---|---|---|
| CN | 203018917 U | 6/2013 |
| DE | 3928092 A1 | 2/1991 |
| DE | 102008050992 B3 | 4/2010 |
| GB | 1341183 A | 12/1973 |

OTHER PUBLICATIONS

UKIPO Examination Report under Section 18(3) for Application No. GB1700808.7 dated Apr. 12, 2019 (3 pages).
UKIPO Combined Search and Examination Report under Section 17 and 18(3) for Application No. GB1700808.7 dated Jul. 6, 2017 (7 pages).
Chinese Office Action for Application No. CN201880007113.0 dated Feb. 8, 2021 (23 pages; with English translation).

* cited by examiner

11,498,142 B2

LASER METAL WIRE DEPOSITION

CROSS-REFERENCE TO RELATED APPLICATIONS

This application is a national stage of, and claims priority to, Patent Cooperation Treaty Application No. PCT/EP2018/051126, filed on Jan. 17, 2018, which application claims priority to Great Britain Application No. GB 1700808.7, filed on Jan. 17, 2017, which applications are hereby incorporated herein by reference in their entireties.

FIELD

The present disclosure relates to a wire dispenser which in particular but not exclusively is suitable for use in a laser metal deposition machine and to the cooling of the wire dispenser.

BACKGROUND

Laser metal wire deposition (LMDw) is used in, for example, the aerospace industry and is a form of additive manufacturing (AM). As one example of its use, LMDw may be used to form a flange on a fan case mount ring of a gas turbine engine along a circumferential deposition line.

Such an example of a known use of LMDw is shown in FIGS. 1A to 1C.

FIG. 1A shows a robot 11 of a manufacturing cell 1 for performing LMDw on a workpiece in the form of a fan case mount ring 14 (see FIG. 1B). The robot 11 has an arm 12 which carries a head 13. The head 13 includes a laser unit 2 which emits a laser beam and a wire dispenser 3 which is positioned in the manner of an arm at the side of the laser unit 2 and dispenses a wire. The laser beam and the wire meet at a laser metal wire deposition site on the fan case mount ring 14.

The fan case mount ring 14 is rotatably supported on a turntable 15 which is shown in FIG. 1B and which rotates the fan case mount ring 14 to move the laser metal wire deposition site 16 relative to the fan case mount ring 14, so that a circumferential layer or bead 141 (see FIG. 1C) is deposited around the fan case mount ring 14. A flange is then built up layer by layer (bead by bead) and, after all of the layers (beads) have been deposited, the flange may be machined to give the flange its final shape.

FIG. 2 is a diagrammatic representation of the tool configuration at the laser metal wire deposition site 16. The laser unit 2 emits a laser beam 21 towards the LMDw site 16, and the wire dispenser 3 feeds a wire 4 towards the LMDw site 16. The power of the laser beam is of the order of 6 kW.

At the LMDw site 16, the laser beam 21 melts the wire 4 and a new layer 142 is laid down on a substrate 143 (e.g. on the fan case mount ring 14, or on a layer 141 which has already been deposited on the fan case mount ring 14). This formation of the new layer 142 is a form of additive layer manufacturing and, in the context of the fan case mount ring 14, serves to form or build up a flange.

A control unit (not shown) controls the position of the laser unit 2 and the feeding of wire by the wire dispenser 3, in response to inputs such as desired layer height and desired tool (laser unit) offset, and the measured height of the surface of the substrate 143 as the substrate 143 moves in the direction 1431.

The wire dispenser 3 includes a nozzle 5 at the forward or distal end of the wire dispenser 3, and the wire 4 is fed out of the front end or tip of the nozzle 5. The nozzle 5 is close to the LMDw site 16, and during the deposition process (as the new layer 142 is laid down) the nozzle 5 is exposed to elevated temperatures (e.g. from radiant heat from the LMDw site 16) and reflections of the laser beam 21.

Consequently, the tip of the nozzle 5 can start to melt, and the metal material (e.g. copper) of the nozzle 5 may contaminate the new layer 142, which may for example be a titanium layer.

It is desirable for the additive layer manufacturing process (the deposition process of the new layer 142) to be continuous and without interruptions for reasons of manufacturing efficiency. However, when the tip of the nozzle 5 starts to melt, the manufacturing process has to be interrupted and the nozzle 5 has to be replaced with a new nozzle. These interruptions in the continuous process lead to a lower (slower) deposition rate (measured in kg/hour) and to the incurring of expenditure in the form of the cost of providing new nozzles.

The melting of the tip of the nozzle 5 means that, for example, the nozzle needs to be replaced after the laying down of a maximum of 6 beads (layers), which corresponds to an operation time of under 30 minutes. The deposition process is typically performed in an enclosed argon gas environment (in a chamber or tent). Thus, in order to replace a nozzle, the chamber or tent must be opened, the nozzle replaced and the chamber or tent re-filled with argon gas so that the subsequent deposition process achieves the required purity level. Overall, the time taken to replace a nozzle is about 5 to 10 minutes.

In order to make a nozzle last for a longer period of time, the onset of significant melting of the nozzle may be delayed by reducing the deposition rate by decreasing the power of the laser beam. However, this reduces the productivity of the manufacturing process because it would take longer to deposit a particular amount of material on the workpiece.

Reducing the deposition rate by reducing the laser power goes against current business trends which are pushing for increasing the deposition rate to increase manufacturing efficiency (productivity) by, for example, increasing the laser power.

It would be desirable to improve the process of laser metal wire deposition.

SUMMARY

According to a first aspect, there is provided a wire dispenser for a laser metal wire deposition machine, the wire dispenser comprising: a duct for guiding a wire from a proximal end to a distal end of the duct; and a nozzle unit connected to the distal end of the duct and having a through bore for receiving the wire from the distal end of the duct and for discharging the wire adjacent to a laser metal wire deposition site; wherein the nozzle unit includes a cooling circuit for a cooling liquid.

By providing cooling of the nozzle unit, the onset of significant melting of the nozzle unit may be delayed or prevented, and thus manufacturing efficiency may be increased by reducing or eliminating the downtime (the interruptions) associated with replacing the nozzle unit. Also there is the saving of the cost of having to provide replacement nozzle units or parts thereof.

In an exemplary manufacturing cell, the deposition process has been run for over ten hours without having to replace a nozzle unit, compared with the typical time period of 30 minutes that was previously experienced before a nozzle needed to be replaced. It is envisaged that the manufacturing cell which uses the present invention may make faster deposition rates possible by increasing the laser power (e.g. from 6 kW to 12 kW).

In some examples, the nozzle unit includes a metal front block positioned laterally of a front portion of the through bore of the nozzle unit and a rear cooling portion positioned laterally of a rear portion of the through bore of the nozzle unit and rearwardly of the front block; and the rear cooling portion of the nozzle unit contains the cooling circuit.

The metal block may be considered to be acting as a heat sink which absorbs the heat radiated from the LMDw site and the laser light reflected from the LMDw site. The metal may give the block sufficient thermal mass, and the thermal energy taken up by the metal block is then carried away by the cooling function of the rear cooling portion.

The rear cooling portion and the metal front block may comprise a single (monolithic) metal block.

The rear cooling portion may contain a chamber which forms a front portion of the cooling circuit. A coolant inlet pipe may be connected to a front end of the chamber. A coolant outlet pipe may be connected to a rear end of the chamber.

In some examples (e.g. when the laser beam has a power of the order of 6 kW), the flow rate of the cooling liquid (e.g. water) is 0.15 to 0.35 $m^3$/hour or 0.2 to 0.3 $m^3$/hour. When the laser beam has a higher power, the flow rate may be scaled up accordingly.

The metal block may be given a polished surface to assist with reflecting away scattered laser light.

In some examples, the nozzle unit is of a replaceable type which is removable from the distal end of the duct.

In some examples, the metal front block and the rear cooling portion form a sleeve-like device around a metal nozzle which contains the through bore for the wire.

This provides a convenient way of retro-fitting existing apparatus. An existing nozzle may have a sleeve-like device (metal front block and the rear cooling portion) produced which fits the existing nozzle. Also, the nozzle (if worn out) may be replaced without having to replace the sleeve-like cooling device, and vice versa.

The sleeve-like device may be slidably fitted onto the metal nozzle. The sleeve-like device may frictionally grip the metal nozzle.

In some examples, the rear cooling portion has a circumferential line of contact with the metal nozzle.

For example, an outside diameter of the nozzle may substantially match (may be the same as) an internal diameter of the sleeve-like device.

A large thermal path (around a full circumference) from the nozzle to the sleeve-like cooling device increases the effectiveness of keeping the nozzle cool.

In some examples, the volume of metal of the metal front block is greater than the volume of metal of that part of the metal nozzle which is seated within the metal front block.

This helps the metal front block to act as a heat sink sparing the nozzle from heating up and therefore helping to prevent unwanted melting of the nozzle itself.

In some examples, the nozzle is of a replaceable type which is removable from the distal end of the duct.

In some examples, the sleeve-like device has a sleeve bore extending from a rear face of the rear cooling portion to a front face of the front block and the nozzle is seated in the sleeve bore.

The nozzle may obstruct the sleeve bore. This may be acceptable because there is no need for a longitudinal passageway along the full length of the sleeve bore for the purpose of supplying gas to the nozzle tip. A nozzle which obstructs the sleeve bore helps to ensure a large thermal path for cooling the nozzle.

For a range of existing nozzles of different external diameter, a range of sleeve-like devices may be produced having internal diameters of the sleeve bores which fit the external diameters of the nozzles.

In some examples, the longitudinal position of the nozzle in the sleeve bore is such that a front tip of the nozzle is within a range of plus or minus 5 mm (more preferably, plus 1 mm or minus 5 mm) of the front face of the front block. When deciding to what extent the tip of the nozzle should protrude or be recessed relative to the front face of the front block, it may be desirable to aim for it to be flush or just slightly recessed.

In some examples, the cooling circuit of the nozzle unit has an inlet and an outlet at a rear face of the nozzle unit, and a coolant liquid inlet pipe is connected to the inlet and a coolant liquid outlet pipe is connected to the outlet.

By so positioning the inlet and outlet pipes, they may be shielded from being exposed to heat from the LMDw site.

The inlet and outlet pipes may be soldered to the inlet and the outlet of the nozzle unit to prevent leakage of the coolant liquid. The inlet and outlet pipe may each have an internal diameter of 3 to 6 mm, or 3 to 5 mm, or 4 mm. The outer diameter may typically be 2 mm greater than the internal diameter.

In some examples, the cooling circuit of the nozzle unit is configured to have an inlet temperature of the cooling liquid of 10 to 40° C., or 10 to 30° C., or 15 to 25° C., or 18 to 22° C., or 20° C.

In some examples, a cooling jacket having a cooling circuit is positioned around the duct. Such a rearward cooling jacket (remote from the forward point of discharge of the wire adjacent to the LMDw site) may be configured so that the cooling circuit of the cooling jacket is connected to the cooling circuit of the nozzle unit. Thus, cost may be reduced because only one overall cooling circuit needs to be provided which operates at two different locations (one rearward and one forward).

According to a second aspect, there is provided a laser metal wire deposition machine comprising a laser unit defining a laser beam axis and a wire dispenser according to the first aspect of the present invention, wherein the through bore of the nozzle unit of the wire dispenser defines a wire dispensing axis and the laser beam axis and the wire dispensing axis meet at the laser metal wire deposition site.

In some examples, the wire dispenser is provided as part of an arm which is attached to a side of the laser unit.

In some examples, a gas chamber contains the laser unit, the wire dispenser and a jig for supporting a workpiece.

For example, the jig may be a turntable for rotatably supporting a workpiece such as a cylindrical workpiece.

In some examples, the laser unit is arranged to emit a laser beam along the laser beam axis having a power of 4, 5 or 6 kW to 12, 16 or 20 kW.

According to a third aspect, there is provided a wire dispenser for a laser metal wire deposition machine, the wire dispenser comprising: a duct for guiding a wire from a proximal end to a distal end of the duct; a metal nozzle connected to the distal end of the duct and having a through bore for receiving the wire from the distal end of the duct and for discharging the wire adjacent to a laser metal wire deposition site; and a thermal control device in the form of a sleeve which is fitted around the nozzle; wherein the thermal control device includes a cooling circuit for a cooling liquid.

This construction reflects how the concept of cooling may be applied at the discharge tip of the wire dispenser in a manufacturing cell where a sleeve-like thermal control device is retro-fitted onto an existing nozzle.

In some examples, a sleeve bore of the thermal control device has a rear bore portion which is in thermal contact with a rear portion of the nozzle and a front bore portion which surrounds a tapered front portion of the nozzle with an annular chamber therebetween.

This arrangement reflects the fact that existing nozzles may typically have a tapered front portion and that the sleeve bore may typically be cylindrical, e.g. circular in cross-section. If desired, the annular chamber may be filled in, e.g. with reflective material, or may be left as an empty gap.

In some examples, the rear bore portion is in thermal contact around a full circumference of the rear portion of the nozzle.

In some examples, the cooling circuit of the thermal control device is provided in a rear portion of the thermal control device and a front portion of the thermal control device comprises a metal block.

In effect, the front block portion acts as a forward heat sink and shield and heat may flow rearwardly to be carried away by the cooling circuit.

In some examples, the thermal control device is asymmetrically positioned around the nozzle.

Thus the majority of the thermal control device may be positioned on the side of the nozzle remote from the workpiece to make it easier to avoid the thermal control device from clashing with (touching) the workpiece during a deposition procedure.

In some examples, a front face of the thermal control device comprises a first portion which is substantially perpendicular to the longitudinal axis of the nozzle and which surrounds a tip of the nozzle and a second portion which is rearwardly inclined and is offset laterally relative to the longitudinal axis of the nozzle; and the cooling circuit is positioned rearwardly of said second portion.

By inclining the second portion of the front face of the thermal control device, the emission axis of the laser beam is less likely to hit the thermal control device during a deposition procedure.

Features of the first aspect may be applied mutatis mutandis to the third aspect, and vice versa.

According to a fourth aspect, there is provided a method of performing laser metal wire deposition on a workpiece using a laser unit which emits a laser beam along a laser beam axis and a wire dispenser which dispenses a wire along a wire dispensing axis, comprising: positioning a laser metal wire deposition site of the workpiece at an intersection of the laser beam axis and the wire dispensing axis; emitting the laser beam along the laser beam axis; and feeding the wire along a duct of the wire dispenser and into a through bore of a nozzle unit of the wire dispenser, and dispensing the wire along the wire dispensing axis out of the through bore of the nozzle unit as the wire is consumed by a metal wire deposition operation at the laser metal wire deposition site; wherein the nozzle unit includes a metal front block positioned laterally of a front portion of the through bore of the nozzle unit and a rear cooling portion positioned laterally of a rear portion of the through bore of the nozzle unit and rearwardly of the front block; and the rear cooling portion of the nozzle unit contains a coolant circuit, and coolant is circulated along the coolant circuit and cools the metal front block of the nozzle unit.

The coolant is currently liquid (e.g. water) in the manufacturing cell, but the coolant may in general be a fluid (liquid or gas).

In some examples, the laser metal wire deposition is performed in a gas chamber which contains an inert gas.

In some examples, the workpiece is a fan case mount ring and the laser metal wire deposition site is on a flange of the fan case mount ring.

BRIEF DESCRIPTION OF THE DRAWINGS

Some embodiments will now be described, by way of example only, with reference to the accompanying drawings in which:—

FIG. 1A is an overall perspective view, and FIGS. 1B and 1C are more-detailed perspective views.

FIG. 4 is a perspective front view.

FIG. 5 is a side view. FIG. 6 is a plan view. FIG. 7 is a longitudinal sectional view. FIG. 8 is longitudinal sectional view similar to FIG. 7 but with some of the sectional detail depicted in solid to make some of the internal features easier to see.

Figure 1A:
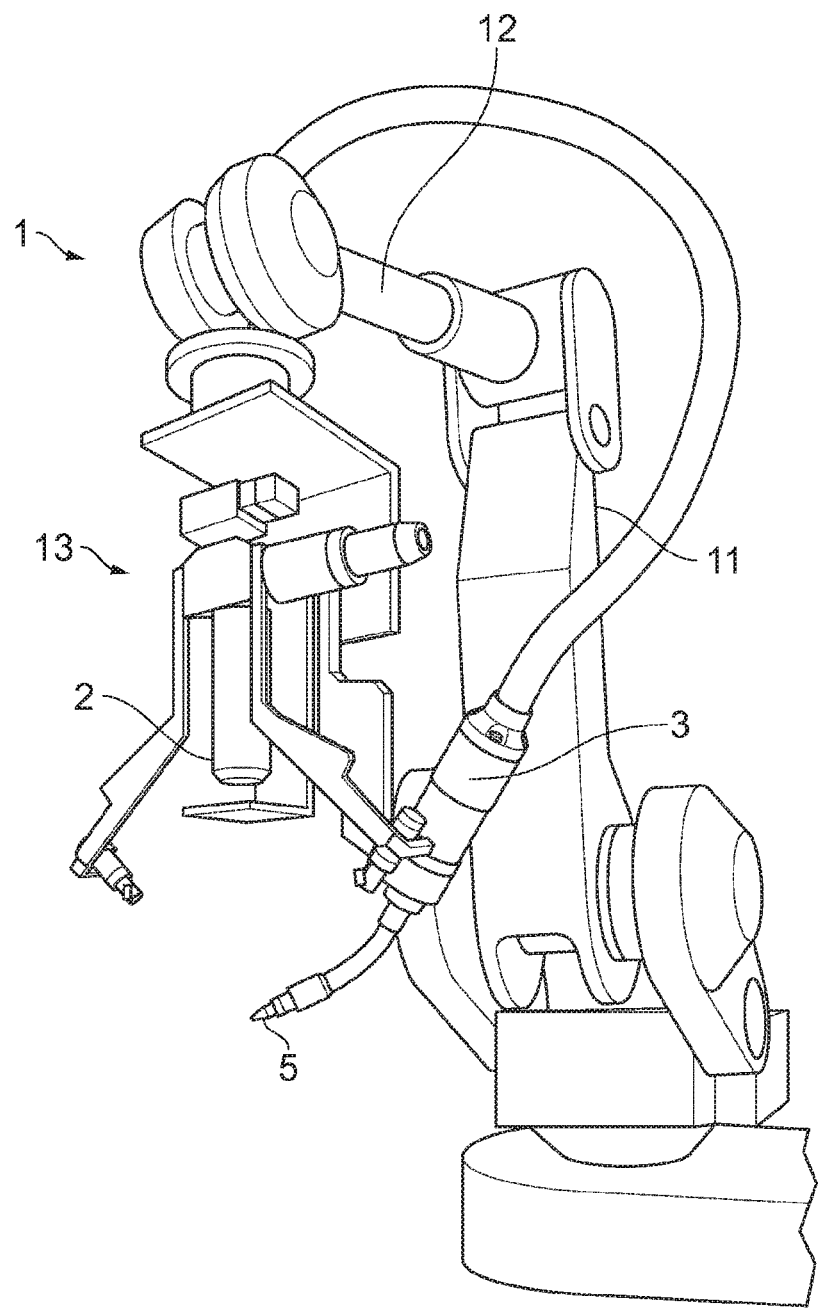
FIGS. 1A to 1C show a manufacturing cell of the prior art for performing laser metal wire deposition (LMDw) on a fan case mount ring.
Figure 1B:
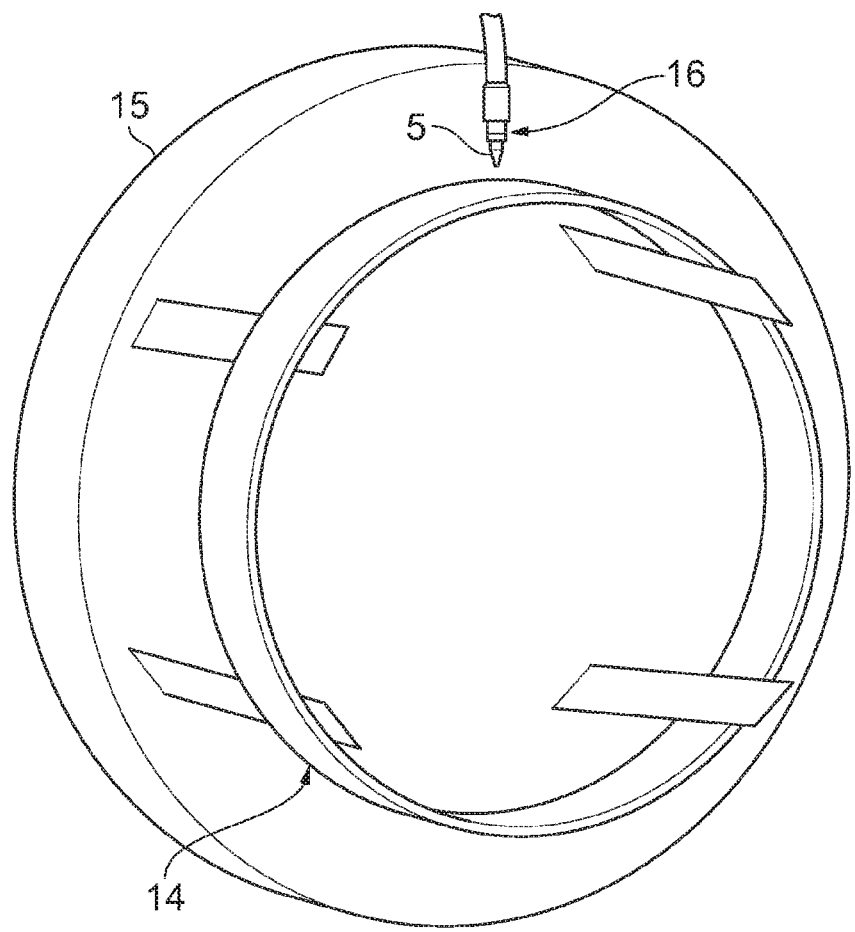
Figure 1C:
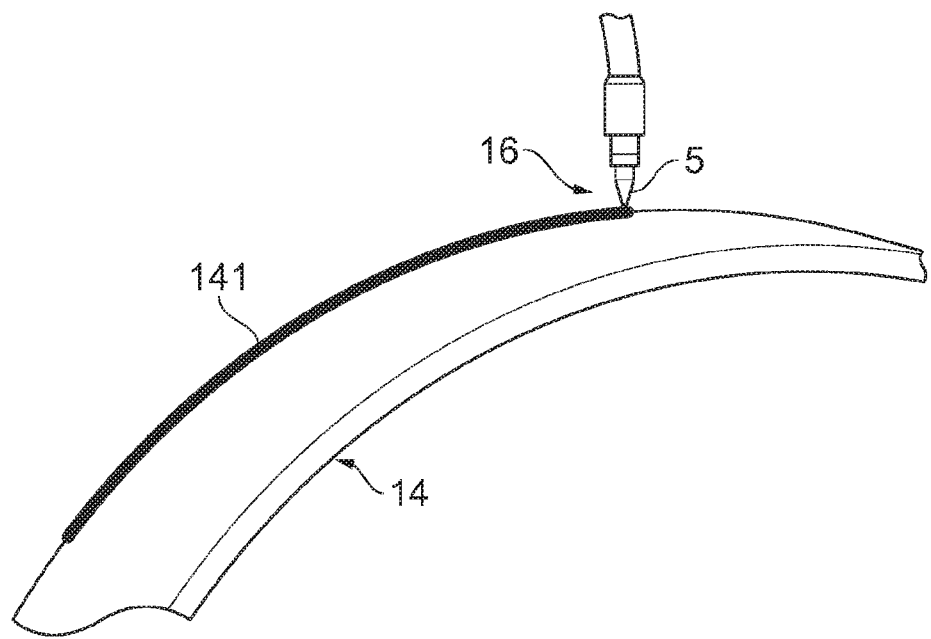
Figure 2:
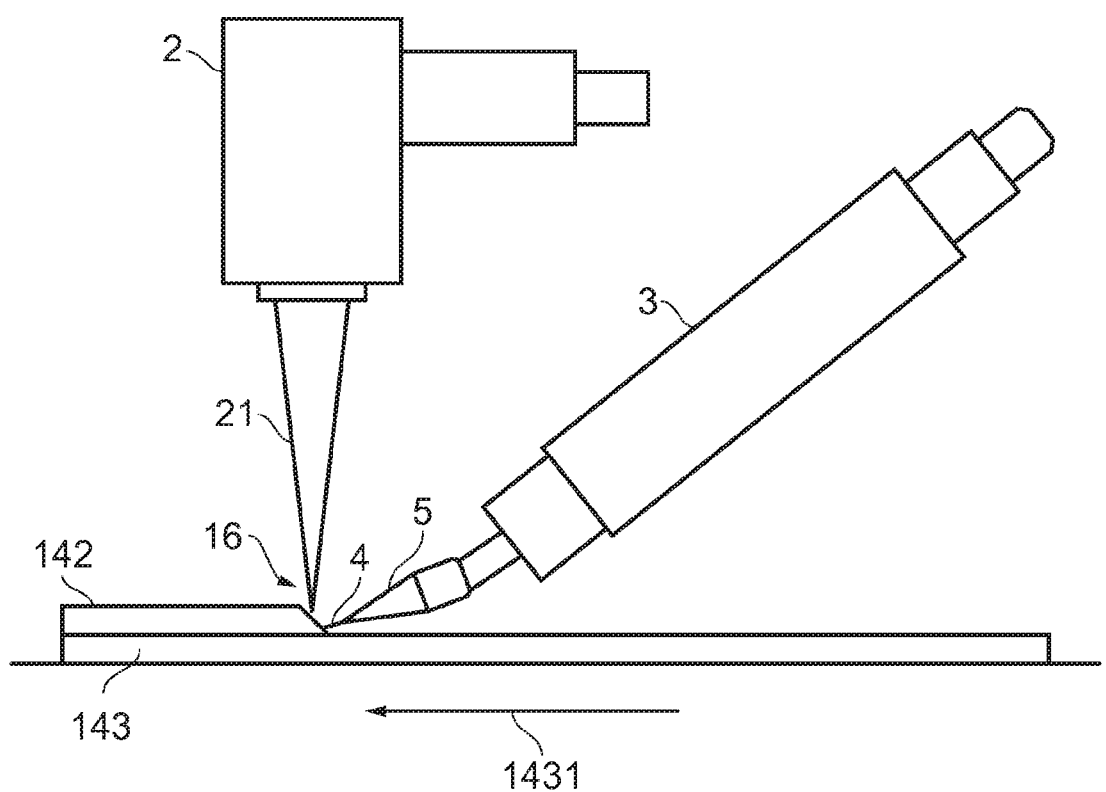
FIG. 2 is a diagrammatic representation of a prior art tool configuration at an LMDw site.

While the presently claimed invention is susceptible to various modifications and alternative forms, some embodiments are shown by way of example in the drawings and are herein described in detail. It should be understood, however, that the drawings and detailed description of these embodiments are not intended to limit the invention to the particular forms disclosed. On the contrary, the invention covers all modifications, equivalents and alternatives falling within the spirit and the scope of the present invention as defined by the appended claims. In addition the invention covers not only individual embodiments but also combinations of the embodiments described.

DESCRIPTION

Figure 3:
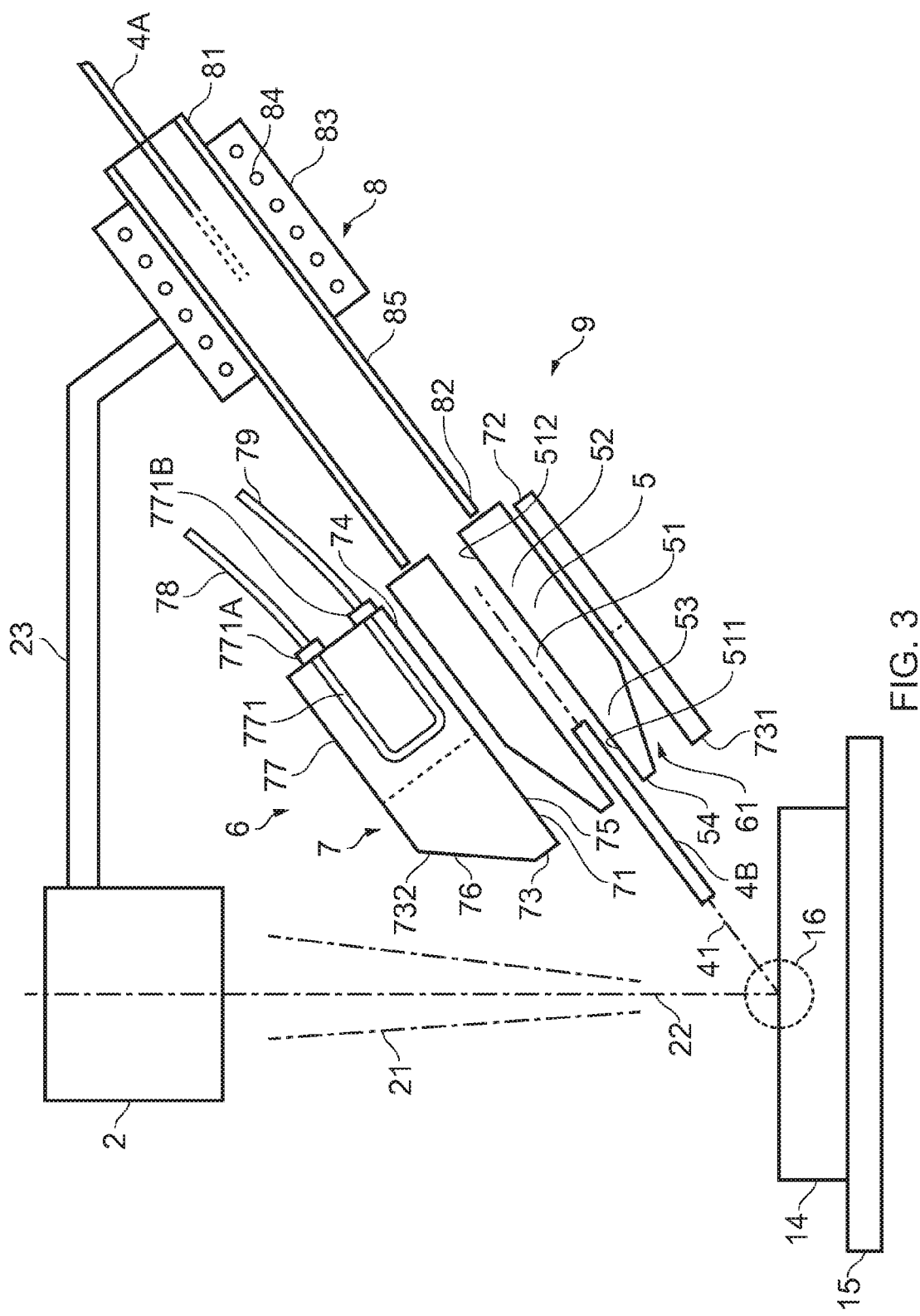
FIG. 3 is a diagrammatic representation of an LMDw machine, in which the wire dispenser is shown in cross-section.

FIG. 3 shows, in diagrammatic form, an example LMDw machine, wherein nozzle tip cooling is retro-fitted onto an existing metal (e.g. copper) nozzle 5.

As shown in FIG. 3, the nozzle 5 is arranged to discharge a metal wire 4 along a wire dispensing axis 41 towards an LMDw site 16 on a workpiece 14 which is mounted on a jig 15. For the sake of visual clarity, only portions 4A, 4B of the wire 4 are shown, although in reality the wire 4 is continuous and extends to the LMDw site 16.

A laser unit 2 is used to emit a laser beam 21 along a laser beam axis 22 to intersect with the wire 4 at the LMDw site 16.

The nozzle 5 has a through bore 51 which has a front portion 511 and a rear portion 512. The wire 4 extends through the bore 51.

A rear portion 52 of the nozzle 5 has a cylindrical outer surface and a front portion 53 has a tapered outer surface which leads to a front tip 54.

The nozzle 5 forms part of a nozzle unit 6. The other component of the nozzle unit 6 is a thermal control device 7 which serves to cool the nozzle 5 and to shield the nozzle 5 from the heat radiated from the LMDw site 16 and from laser light reflected from the workpiece 14. To assist with reflecting away the laser light, the external surface of the thermal control device 7 may be polished to make it reflective.

The thermal control device 7 is made of metal (e.g. copper) and has a sleeve-like shape with a sleeve bore 71 which extends from a rear face 72 to a front face 73 of the device 7. The nozzle 5 is received in the sleeve bore 71. In FIG. 3, for reasons of clarity of depiction, a gap is shown between the rear portion 52 of the nozzle 5 and a rear bore portion 74 of the sleeve bore 71. In reality, the rear bore portion 74 of the sleeve bore 71 forms a close fit with the rear portion 52 of the nozzle 5 to provide thermal conduction between the nozzle 5 and the device 7.

A front bore portion 75 of the sleeve bore 71 is spaced away from the tapered front portion 53 of the nozzle 5 and an annular gap 61 is present therebetween.

The thermal control device 7 has the form of a body which is separated into a solid-metal front block 76 and a hollow rear cooling portion 77. The rear cooling portion 77 is hollow because is contains an internal passageway 771 which functions as a cooling circuit having an inlet 771A and an outlet 771B. A coolant liquid inlet pipe 78 is soldered to the inlet 771A and a coolant liquid outlet pipe 79 is soldered to the outlet 771B. Each pipe 78, 79 has an internal diameter of 4 mm and an external diameter of 6 mm.

A longitudinal duct 8 has a proximal (inlet or rear) end 81 for receiving the wire 4 and a distal (outlet or front) end 82 for discharging the wire 4. The distal end 82 is releasably connected (e.g. screw threadedly connected) to the rear portion 52 of the nozzle 5 and is arranged to feed the wire 4 into the through bore 51 of the nozzle 5.

The wire 4 may be advanced (fed forwards) by any suitable mechanism (not shown) such as pinch rollers or a pneumatic wire delivery mechanism.

A cooling jacket 83 with a cooling circuit 84 is positioned around a main tube 85 of the duct 8. The cooling circuit 84 may be connected to the cooling circuit 771 so that they function as one circuit, or the two cooling circuits 84, 771 may function independently.

The nozzle unit 6 (comprising the nozzle 5 and the thermal control unit 7) and the duct 8 form a wire dispenser 9.

The wire dispenser 9 is supported at one side of the laser unit 2 by means of a support arm 23 which extends from the laser unit 2 to any convenient part of the wire dispenser 9.

It is desirable for the mass (the thermal mass) of metal of the front block 76 of the thermal control unit 7 to be large enough to act as an effective heat sink. Thus, the mass of metal of the front block 76 may be selected to be greater (e.g. at least two times greater, or at least three times greater) than the mass of the metal of that part of the nozzle 5 present inside the front portion 75 of the sleeve bore 71 provided inside the front block 76.

Heat absorbed by the front block 76 may pass rearwardly to the rear cooling portion 77, and then be carried away by the cooling circuit 771. Heat absorbed at and adjacent to the front tip 54 of the nozzle 5 may pass via the rear portion 52 of the nozzle 5 to the rear cooling portion 77, and then be carried away by the cooling circuit 771.

For a laser unit 2 emitting a 6 kW laser beam 21, the inlet temperature of the coolant liquid (e.g. water) received by the cooling circuit 771 may be 20° C. (plus or minus 2° C.) and the flow rate of the coolant may be 0.2 to 0.3 m$^3$/hour.

In this way, the temperature of the nozzle 5 may be controlled to be kept below the temperature at which the metal of the front tip 54 of the nozzle 5 might start to melt.

The wire dispenser 9, laser unit 2 and the jig 15 (with its workpiece 14) form a machine which is typically contained inside a chamber or tent (not shown) which is filled with an inert gas such as argon during the deposition process on the workpiece 14.

Because of the effective tip cooling of the nozzle 5 provided by the thermal control unit 7, the nozzle 5 can be prevented from melting for long periods such that the need to replace a melted nozzle can be largely eliminated. This increases the productivity of the LMDw machine. For example, time is not wasted in venting the argon and re-filing the chamber or tent with argon when changing a damaged (melted) nozzle.

It is also envisaged that the effective tip cooling will mean that the power of the laser beam 21 may be increased which would increase productivity by increasing the deposition rate. The feed rate of the wire 4 would be increased commensurately.

The thermal control unit 7 is asymmetrically shaped relative to the nozzle 5, with the majority of the body of the unit 7 being above the nozzle 5 and remote from the workpiece 14. Thus, the nozzle 5 should not be restricted in being able to approach closely the workpiece 14 during the deposition process.

A top front corner of the body of the thermal control unit 7 is chamfered to reduce the risk of clashing with the laser beam 21. The front face 73 has a first portion 731 around the sleeve bore 71 which is perpendicular to the axis 41 and a second (upper) portion 732 which is above the first portion 731 and inclined rearwardly.

FIGS. 4-8 show a version of a wire dispenser 9 which forms another embodiment.

Figure 4:
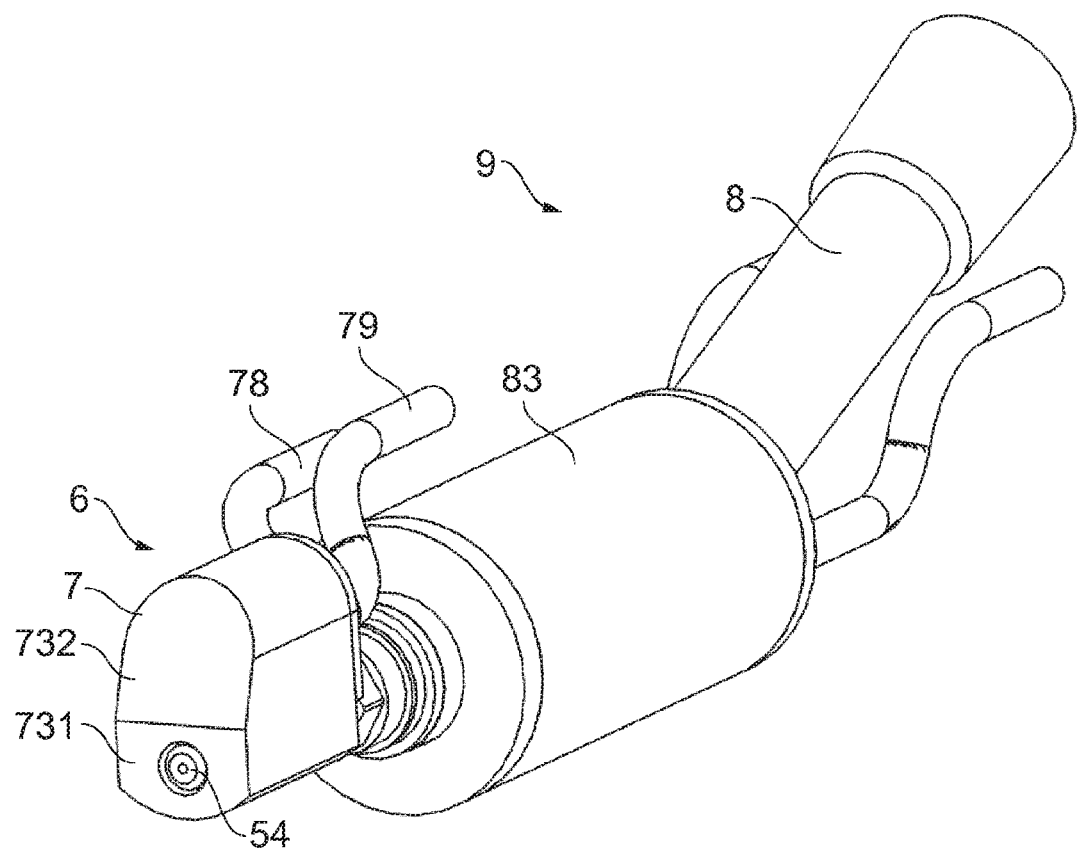
FIGS. 4-8 show another example wire dispenser.
Figure 5:
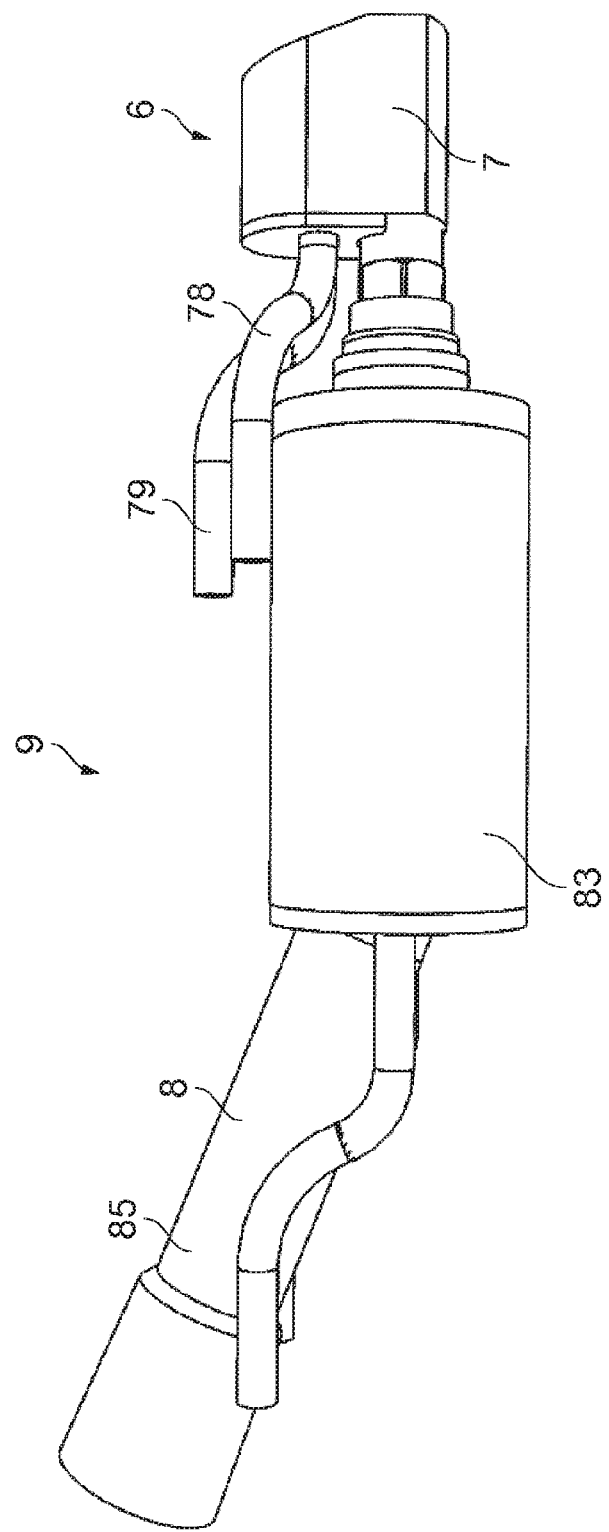
Figure 6:
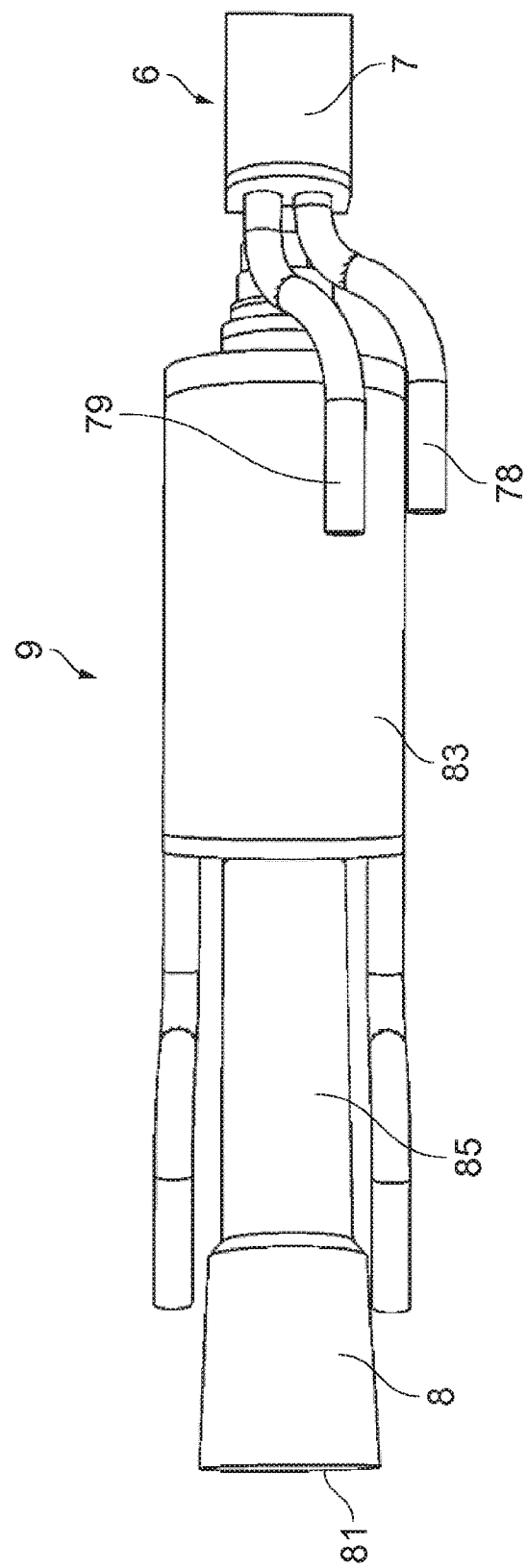
Figure 7:
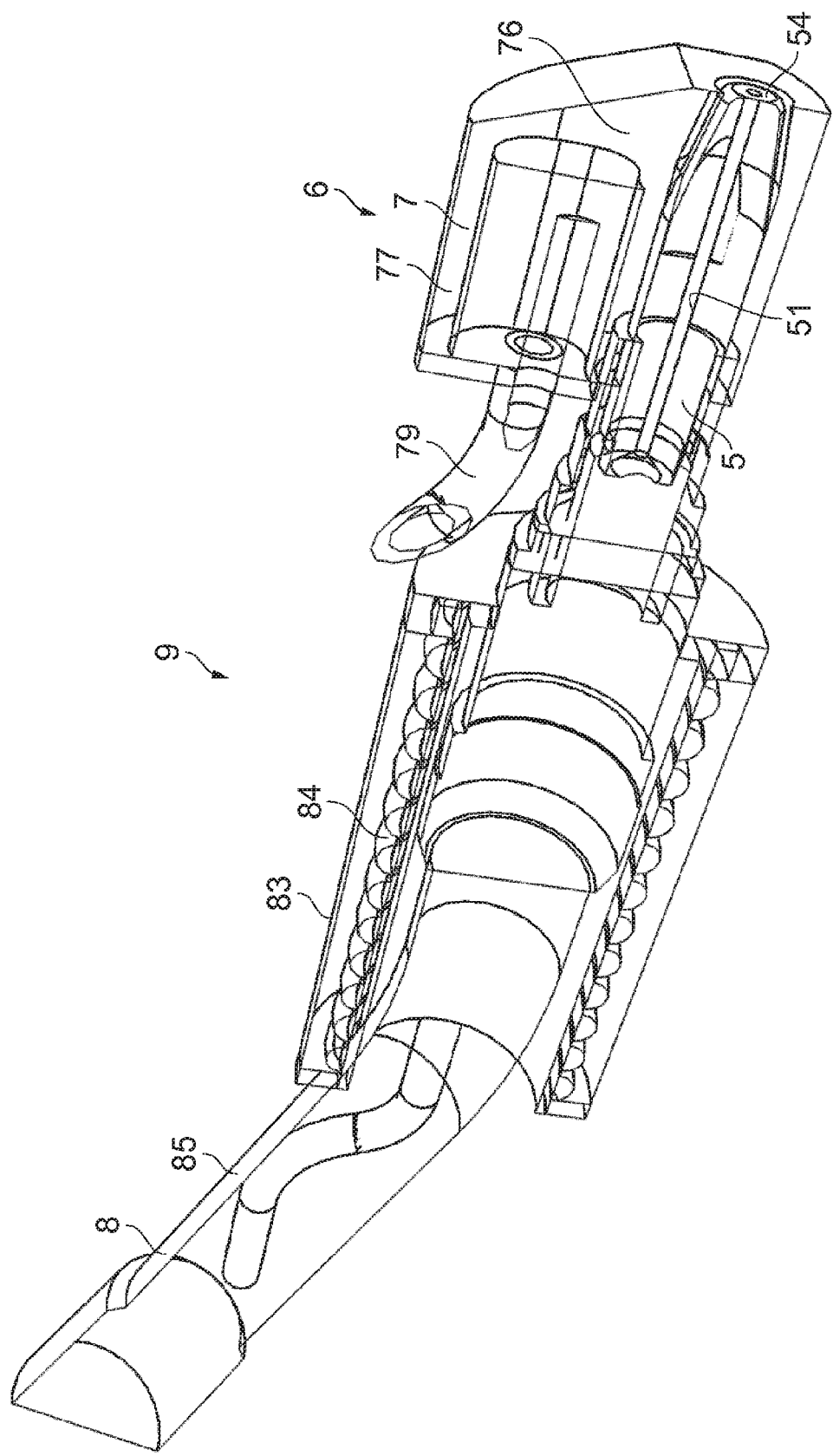
Figure 8:
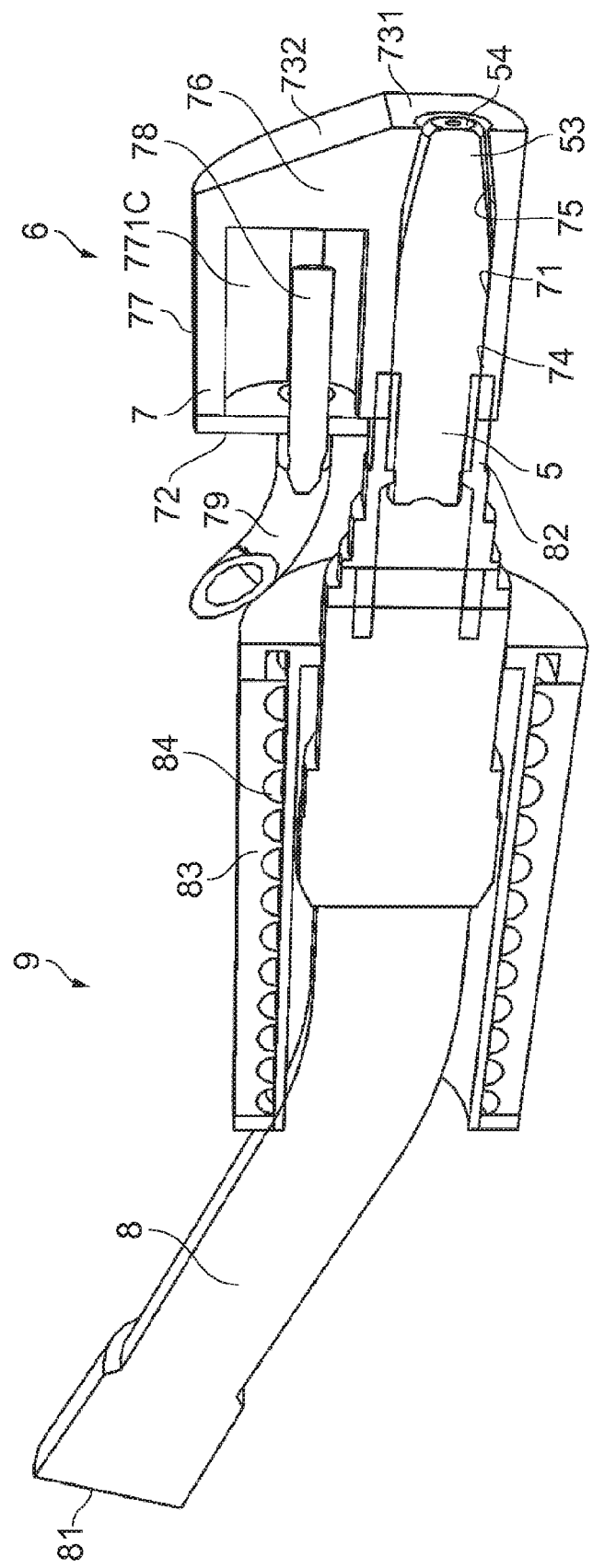

FIG. 4 is a perspective front view. FIG. 5 is a side view. FIG. 6 is a plan view. FIG. 7 is a longitudinal sectional view. FIG. 8 is longitudinal sectional view similar to FIG. 7 but with some of the sectional detail depicted in solid to make some of the internal features easier to see.

FIGS. 7 and 8 show a variation compared with the wire dispenser 9 of FIG. 3. In FIGS. 7 and 8, the sleeve bore 71 of the thermal control unit 7 is not cylindrical along its full length. The rear bore portion 74 is cylindrical, but the front bore portion 75 is tapered in the forward direction to match the tapering of the front portion 53 of the nozzle 5.

FIGS. 7 and 8 also show how the nozzle tip 54 is substantially flush with the first portion 731 of the front face 73. Alternatively, the nozzle tip 54 may protrude slightly or be recessed slightly.

In relation to the embodiment of FIGS. 4 to 8, it may be seen that the nozzle 5 is effectively shielded by the thermal control unit 7.

The nozzle tip 54 is cooled by being surrounded with the cooling effect provided by the thermal control unit 7, and the nozzle 5 may be prevented from melting. By supplying chilled water to the thermal control unit 7 at a suitable temperature and flow rate, the desired amount of cooling may be achieved taking into account the power of the laser beam 21.

From FIGS. 4 to 8, it may also be seen that the internal passageway (cooling circuit) of the thermal control unit 7 is provided in the form of a chamber 771C in the rear cooling portion 77. The inlet pipe 78 extends to the front of the chamber 771C, and the outlet pipe 79 vents the rear of the chamber 771C.

The invention claimed is:

1. A wire dispenser for a laser metal wire deposition machine, the wire dispenser comprising:
   a longitudinal duct for guiding a wire from a proximal end to a distal end of the duct; and
   a nozzle unit connected to the distal end of the duct and having a through bore for receiving the wire from the distal end of the duct and for discharging the wire adjacent to a laser metal wire deposition site;
   wherein the nozzle unit includes a cooling circuit for a cooling liquid;
   the nozzle unit includes a metal front block positioned laterally of a front portion of the through bore of the nozzle unit and a rear cooling portion positioned laterally of a rear portion of the through bore of the nozzle unit and rearwardly of the front block;
   the rear cooling portion of the nozzle unit contains the cooling circuit;
   the metal front block and the rear cooling portion form a sleeve-like device which is removably fitted onto a metal nozzle which contains the through bore for the wire;
   the metal nozzle is of a replaceable type which is removable from the distal end of the duct;
   the sleeve-like device has a sleeve bore extending from a rear face of the rear cooling portion to a front face of the front block and the metal nozzle is seated in the sleeve bore; and
   the longitudinal position of the metal nozzle in the sleeve bore is such that a front tip of the metal nozzle is within a range of plus 1 millimeter to minus 5 millimeters from the front face of the front block.

2. The wire dispenser according to claim 1, wherein the rear cooling portion has a circumferential line of contact with the metal nozzle.

3. The wire dispenser according to claim 1, wherein a volume of metal of the metal front block is greater than a volume of metal of a part of the metal nozzle which is seated within the metal front block.

4. The wire dispenser according to claim 1, wherein the metal nozzle obstructs the sleeve bore.

5. The wire dispenser according to claim 1, wherein the cooling circuit of the nozzle unit has an inlet and an outlet at a rear face of the nozzle unit, and a coolant liquid inlet pipe is connected to the inlet and a coolant liquid outlet pipe is connected to the outlet.

6. The wire dispenser according to claim 1, wherein a cooling jacket having a cooling circuit is positioned around the duct, and the cooling circuit of the cooling jacket is connected to the cooling circuit of the nozzle unit.

7. A laser metal wire deposition machine comprising
   a laser unit defining a laser beam axis; and
   a wire dispenser, the wire dispenser including
      a longitudinal duct for guiding a wire from a proximal end to a distal end of the duct; and
      a nozzle unit connected to the distal end of the duct and having a through bore for receiving the wire from the distal end of the duct and for discharging the wire adjacent to a laser metal wire deposition site;
      wherein the nozzle unit includes a cooling circuit for a cooling liquid;
      the nozzle unit includes a metal front block positioned laterally of a front portion of the through bore of the nozzle unit and a rear cooling portion positioned laterally of a rear portion of the through bore of the nozzle unit and rearwardly of the front block;
      the rear cooling portion of the nozzle unit contains the cooling circuit;
      the metal front block and the rear cooling portion form a sleeve-like device which is removably fitted onto a metal nozzle which contains the through bore for the wire;
      the metal nozzle is of a replaceable type which is removable from the distal end of the duct;
      the sleeve-like device has a sleeve bore extending from a rear face of the rear cooling portion to a front face of the front block and the metal nozzle is seated in the sleeve bore; and
      the longitudinal position of the metal nozzle in the sleeve bore is such that a front tip of the metal nozzle is within a range of plus 1 millimeter to minus 5 millimeters from the front face of the front block; and
   wherein the through bore of the nozzle unit of the wire dispenser defines a wire dispensing axis; and
   the laser beam axis and the wire dispensing axis meet at the laser metal wire deposition site.

8. The laser metal wire deposition machine according to claim 7, wherein the wire dispenser is provided as part of an arm which is attached to a side of the laser unit.

9. The laser metal wire deposition machine according to claim 7, wherein a gas chamber contains the laser unit, the wire dispenser and a jig for supporting a workpiece.

10. A wire dispenser for a laser metal wire deposition machine, the wire dispenser comprising:
    a longitudinal duct for guiding a wire from a proximal end to a distal end of the duct;
    a metal nozzle connected to the distal end of the duct and having a through bore for receiving the wire from the distal end of the duct and for discharging the wire adjacent to a laser metal wire deposition site; and
    a thermal control device in the form of a sleeve which is removably fitted onto the metal nozzle;
    wherein the thermal control device includes a cooling circuit for a cooling liquid;
    a nozzle unit includes the metal nozzle and the thermal control device;
    the nozzle unit includes a metal front block positioned laterally of a front portion of the through bore of the nozzle unit and a rear cooling portion positioned laterally of a rear portion of the through bore of the nozzle unit and rearwardly of the front block;
    the rear cooling portion of the nozzle unit contains the cooling circuit;
    the metal front block and the rear cooling portion form the sleeve which is removably fitted onto the metal nozzle;
    the metal nozzle is of a replaceable type which is removable from the distal end of the duct;
    the sleeve has a sleeve bore extending from a rear face of the rear cooling portion to a front face of the front block and the metal nozzle is seated in the sleeve bore; and
    the longitudinal position of the metal nozzle in the sleeve bore is such that a front tip of the metal nozzle is within a range of plus 1 millimeter to minus 5 millimeters from the front face of the front block.

11. The wire dispenser according to claim 10, wherein the sleeve bore of the thermal control device has a rear bore portion which is in thermal contact with a rear portion of the metal nozzle and a front bore portion which surrounds a tapered front portion of the metal nozzle with an annular gap therebetween.

12. The wire dispenser according to claim 11, wherein the rear bore portion is in thermal contact around a full circumference of the rear portion of the metal nozzle.

13. The wire dispenser according to claim 10, wherein the thermal control device is asymmetrically positioned around the metal nozzle.

14. The wire dispenser according to claim 10, wherein: the front face of the metal front block comprises a first portion which is substantially perpendicular to the longitudinal axis of the metal nozzle and which surrounds the front tip of the metal nozzle and a second portion which is rearwardly inclined and is offset laterally relative to the longitudinal axis of the metal nozzle.

\* \* \* \* \*